US010389019B2

(12) United States Patent
Bennett et al.

(10) Patent No.: US 10,389,019 B2
(45) Date of Patent: Aug. 20, 2019

(54) METHODS AND SYSTEMS FOR WET RADOME ATTENUATION MITIGATION IN PHASED-ARRAY ANTENNAE APPLICATIONS AND NETWORKED USE OF SUCH APPLICATIONS

(71) Applicants: Andrew Bennett, Belmont, MA (US); Krzysztof Orzel, Gdynia (PL)

(72) Inventors: Andrew Bennett, Belmont, MA (US); Krzysztof Orzel, Gdynia (PL)

(73) Assignee: Point Road Solutions, LLC, Belmont, MA (US)

( * ) Notice: Subject to any disclaimer, the term of this patent is extended or adjusted under 35 U.S.C. 154(b) by 6 days.

(21) Appl. No.: 15/382,644

(22) Filed: Dec. 17, 2016

(65) Prior Publication Data

US 2018/0175495 A1    Jun. 21, 2018

(51) Int. Cl.
| *G01S 7/00* | (2006.01) |
| *H01Q 1/42* | (2006.01) |
| *B64C 1/36* | (2006.01) |
| *B64C 39/02* | (2006.01) |
| *B64D 47/08* | (2006.01) |
| *B64F 1/36* | (2017.01) |
| *G01S 13/66* | (2006.01) |
| *G01S 13/87* | (2006.01) |
| *G01S 13/88* | (2006.01) |
| *G05D 1/00* | (2006.01) |
| *G01S 13/72* | (2006.01) |

(Continued)

(52) U.S. Cl.
CPC ............... *H01Q 1/42* (2013.01); *B64C 1/36* (2013.01); *B64C 39/024* (2013.01); *B64D 47/08* (2013.01); *B64F 1/362* (2013.01); *G01S 7/003* (2013.01); *G01S 13/66* (2013.01); *G01S 13/726* (2013.01); *G01S 13/86* (2013.01); *G01S 13/87* (2013.01); *G01S 13/878* (2013.01); *G01S 13/88* (2013.01); *G05D 1/0011* (2013.01); *B64C 2201/126* (2013.01); *B64C 2201/146* (2013.01); *G01S 13/426* (2013.01); *G01S 2013/0245* (2013.01); *G01S 2013/0254* (2013.01); *H01Q 1/005* (2013.01); *H01Q 1/28* (2013.01); *H01Q 1/3233* (2013.01); *H01Q 1/34* (2013.01); *H01Q 3/34* (2013.01); *H01Q 21/22* (2013.01)

(58) Field of Classification Search
CPC ........ G01S 7/003; G01S 13/426; G01S 13/66; G01S 13/726; G01S 13/86; G01S 13/87; G01S 13/878; G01S 13/88; G01S 2013/0245; G01S 2013/0254; H01Q 1/005; H01Q 1/3233; H01Q 1/42; H01Q 3/34; H01Q 1/28; H01Q 1/34; H01Q 21/22; B64C 1/36; B64C 2201/146; B64C 39/024; B64D 47/08; B64F 1/362; G05D 1/0011
USPC .......................................................... 342/58
See application file for complete search history.

(56) References Cited

U.S. PATENT DOCUMENTS

4,380,012 A * 4/1983 Bevan ................... H01Q 1/428
                                                        343/705
9,614,272 B2 * 4/2017 Wallace ................. H01Q 1/42
(Continued)

*Primary Examiner* — Timothy X Pham
(74) *Attorney, Agent, or Firm* — Willard Alonzo Stanback PC (57) ABSTRACT

Disclosed is the networking of the radar in manners and operating utilizing methods that result in increases in the radar coverage by adding to the possible collection of locations and thus potentially increasing the data to be analyzed—ultimately increasing the accuracy of the readings.

24 Claims, 5 Drawing Sheets

(51) Int. Cl.
  *G01S 13/86* (2006.01)
  *H01Q 1/00* (2006.01)
  *H01Q 1/28* (2006.01)
  *H01Q 1/32* (2006.01)
  *H01Q 1/34* (2006.01)
  *H01Q 3/34* (2006.01)
  *H01Q 21/22* (2006.01)
  *G01S 13/02* (2006.01)
  *G01S 13/42* (2006.01)

(56) References Cited

U.S. PATENT DOCUMENTS

| | | | |
|---|---|---|---|
| 2014/0055316 A1* | 2/2014 | Kasemodel | H01Q 1/421 |
| | | | 343/872 |
| 2014/0240192 A1* | 8/2014 | Jeuland | H01Q 1/36 |
| | | | 343/872 |
| 2015/0002337 A1* | 1/2015 | Wisherd | G01S 5/0221 |
| | | | 342/465 |
| 2015/0207217 A1* | 7/2015 | Fujita | H01Q 1/3233 |
| | | | 343/872 |
| 2017/0155190 A1* | 6/2017 | Kawaguchi | H01Q 1/42 |
| 2018/0246202 A1* | 8/2018 | Kurose | B64G 1/26 |
| 2018/0341017 A1* | 11/2018 | Kamo | G01S 13/345 |

\* cited by examiner

METHODS AND SYSTEMS FOR WET RADOME ATTENUATION MITIGATION IN PHASED-ARRAY ANTENNAE APPLICATIONS AND NETWORKED USE OF SUCH APPLICATIONS

BACKGROUND

These teachings relate generally to methods and systems for the networked use of antennae applications. There is a need to be able to increase the range of radar coverage and data collection potential to ultimately increase the accuracy of the readings.

BRIEF SUMMARY

The networking of the radar increases the radar coverage by adding to the possible collection of locations and thus potentially increasing the data to be analyzed—ultimately increasing the accuracy of the readings.
Networked Radar Operational Elements Summary Individual radar operational elements capable of detection, due to power limitations or by design, for relatively short distances, such as, for example, a few hundred riveters with the level of power used for, for instance, long-range automotive type radars, could be networked together to provide continuous, overlapping coverage of a line of view or area of interest. If the radar operational elements are mobile and equipped with communications and location detection (e.g. GPS), they can be programmed to self-assemble into an array.

By connecting the radar operational elements, the resulting radar operational element system can provide coordinated detection in real or near real time. In one embodiment, the inventive system can exploit the features of existing high-resolution wide band radar technology (e.g. automotive radar operational elements) to create, for example, an array of detectors that are less tasked in their individual operational element operations and thus, as a system, more efficient and effective in collecting data. This army can be manually or automatically assembled. Because each radar operational element can be small and self-contained, each can be mounted on a roof of a vehicle, or secured of securing in a fixed geographical location, such as, for example, on a building roof, on a pole, or anywhere from where the radar operational element can have an unobstructed view (e.g., when collecting overhead data, a "view of the sky"). One of ordinary skill in the art would also recognize that the vehicle to which the radar operational element is mounted could transport the element over water or through the air. With this flexibility in location, users can situate a radar operational element for the most desired data collection. In a preferred embodiment of the present invention, the radar operational element has communications, processing and navigation/location determination capabilities (or it can be pre-programmed with a location when it is installed). It can be powered by, for instance, (A) vehicles upon which it is mounted, (B) batteries, (C) solar panels, (D) fuel cells, (E) forms of wind-generated power, or (F) wiring it into the local power grid.

The invention as a method would comprise the step of transmitting signals between radar operational element(s) and a main control location. This communication could be used, in part, to facilitate the transmitting of signals between transmission enabled objects and the radar operational element(s). With the communication between the radar operational element(s) and the transmission enabled objects established, the transmission enabled objects can be monitored with more precision, using is embodiment of the inventive method. The signal between the radar operational element(s) and the main control distal location may be transmitted via over-the-air technology or via wires, fiber-optic cable or similar and the monitoring of the transmission enabled objects may be made while the radar operational element(s) are mounted movable objects.

A number of other embodiments are disclosed hereinbelow.

For a better understanding of the present teachings, together with other and further needs thereof, reference made to the accompanying drawings and detailed description.

BRIEF DESCRIPTION OF THE DRAWINGS

FIG. 1 shows a radar operational element with GPS and communications components;

DETAILED DESCRIPTION

The following detailed description presents the currently contemplated modes of carrying out the invention. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context dearly dictates otherwise.

Figure 1:
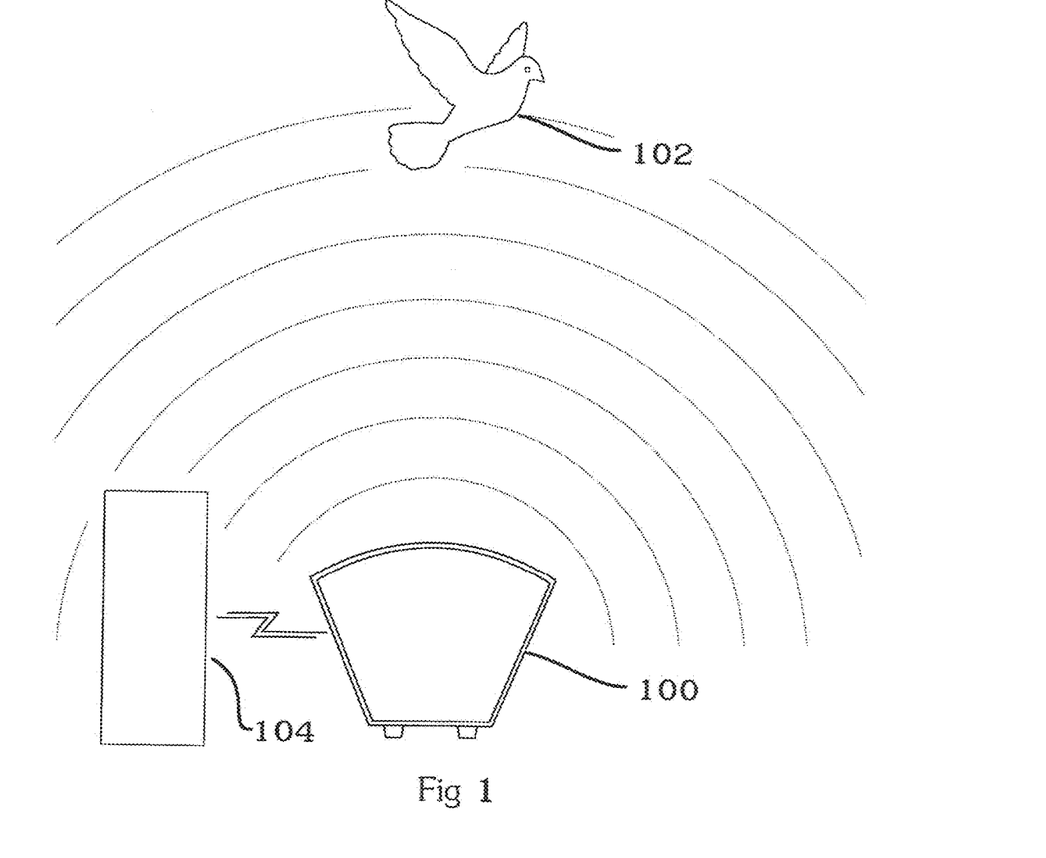
FIG. 1 shows a radar operational element and its air bound coverage areas.

Except here otherwise indicated, all numbers expressing quantities of ingredients, reaction conditions, and so forth used in the specification and claims are to be understood as being modified in all instances by the term "about."
Networked Radar Operational Elements As shown in FIG. 1, radar operational element 100 can provide close-range detection of distal objects (like object 102—e.g., a low flying bird) in real or near real time. The system, made primarily of the radar operational elements, exploits the features of existing high-resolution wide band radar technology (e.g. automotive radar operational elements) to function as a stand-alone detection station or, when preferred, as become part of an array of detectors. As part of an array, the radar operational elements of the system can be manually or automatically assembled, meaning that the user can activate the different radar operational elements in the user's discretion or the system can be programmed to activate specific radar operational elements as certain conditions are met. When the radar operational element is self-contained, weatherproof, small, it can be mounted on a car roof, building roof, on a pole or anywhere that has a view of the sky. A prediction tool can be used to map out the best locations for one or more the radar operational elements. This prediction model uses any local geographic information to determine the optimal number and location of the radar operational elements to guarantee best coverage of the area, perimeter or line of interest to the operator (the geographic data ran be further augmented by performing a 3D survey of the area). Once the location(s) are determined, the operational element(s) are deployed to the assigned-area(s). Each radar operational element can be self-surveyed into position or be mounted and externally surveyed. When installation is complete, the system can be already active.

The inventive system may also include one or more operator control units (OCUs) such as for instance OCU 104, which could be used to display the radar coverage over a map of the local area. The OCU 104 could also be part of a main control computer through which the system user could transmit and receive information and data in exchanges with, the radar operational element(s). These possible transmissions may be conducted through various means that are known to those of ordinary skill in the art (e.g., through the use of radio signal technology, other wireless equipment, wired components and more/alternatives). Where multiple radar operational elements are electronically connected, via the main control computer, to each other the perceptive strength of a resulting array of radar operational elements is more powerful than each individual radar operational element alone.

OCU 104 also may display the health of each individual radar operational element, and, in configurations in which the focus of the radar operational elements is skyward, highlight any airborne objects, and provide trajectory information (e.g. path over time). OCU 104 can be connected to both the detection system as well as the Internet, thereby allowing the information to be shared as necessary. OCU 104 can check actual vs. desired coverage and provide corrections as necessary (or update the map to reflect actual radar locations). As an additional option, if the inventive system is connected to a source of information about the surrounding area, in particular information about authorized objects or other aircraft or the location of objects are, for example, intended to be moved as desired by the system user or not at all, OCU 104 will display that information by denoting authorized objects on the display as they are monitored and/or tracked.

Figure 2:
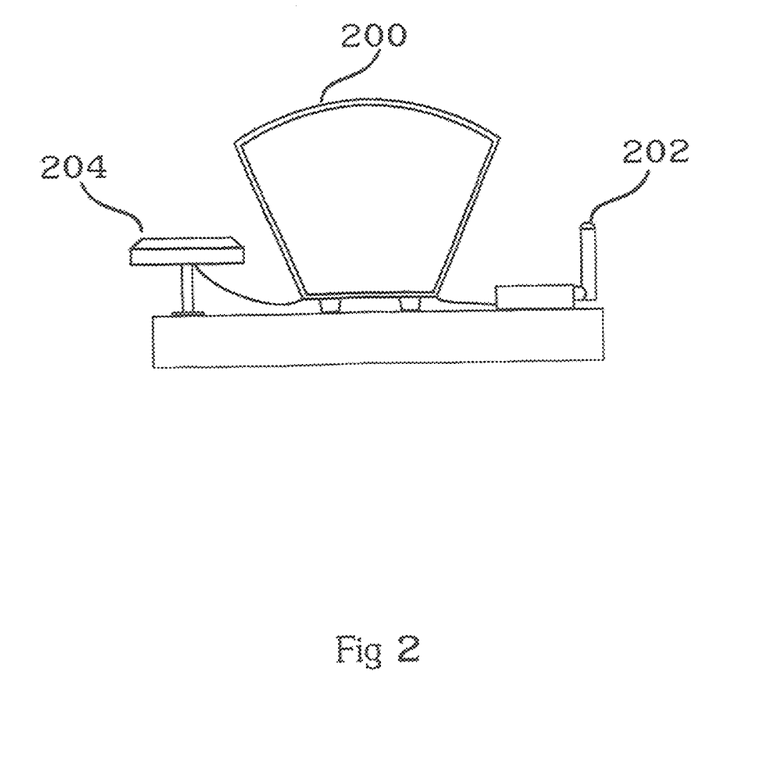

In reference to FIG. 2, one embodiment of the present inventive system includes at least one radar operational element 200 (electronically and/or mechanically steered), a communications capability 202 (radio, wire or fiber according to the local needs and conditions), and an optional geolocation capability 204 (e.g. GPS) or it can be pre-programmed with a location when it is installed. An applicable radar operational element 200 could be powered by a vehicle it is attached to, by batteries, solar panels or by wiring it into the local power grid. In a particular preferred embodiment, radar operational element(s) could have the ability to communicate wirelessly with the transmission, enabled objects and with one or more human operators/users situated in one or more locations that are distal from the location of radar operational element(s).

Figure 3:
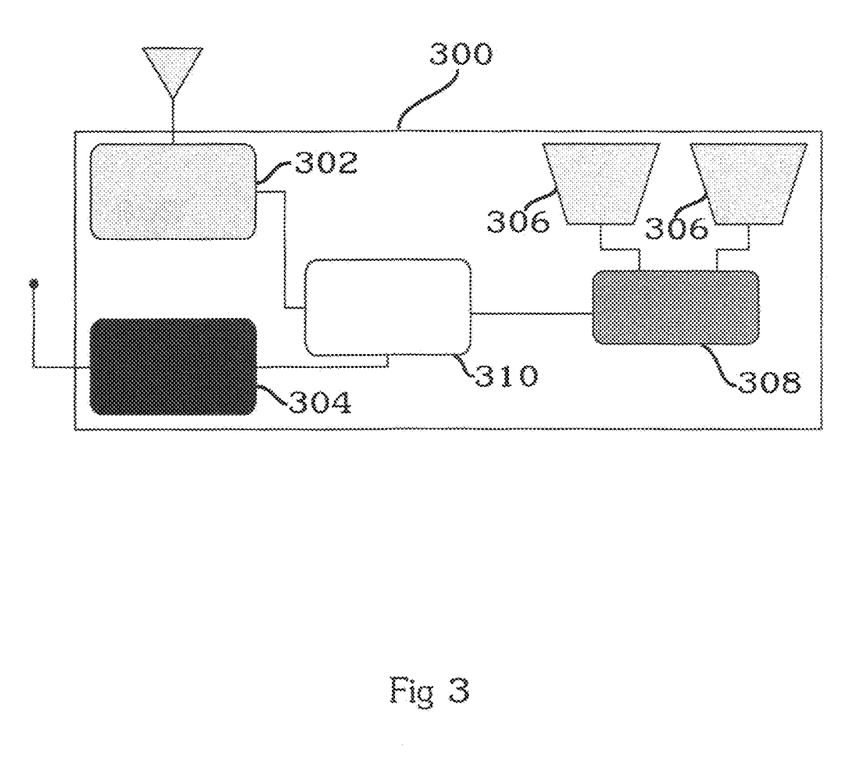
FIG. 3 shows the components of a radar operational element.

FIG. 3 shows a block diagram of radar operational element 300 that is configured for use in a networked system. The diagram includes a GPS component 302 through which the location of radar operational element 300 can be detected and monitored. The comma component 302 enables the commination communication of radar operational element 300 with other devices, systems and networks. The radar elements 306, two in this particular embodiment (more or less than two as warranted), are the components that cause the unit to function as a radar device. The signal processor 308 is the component that interprets and analyzes feeds from the radar elements 306, with such processing being managed and supported by the main computer 310. The main computer 310 also manages and supports the operation of the other components of the radar operational element.

Figure 4:
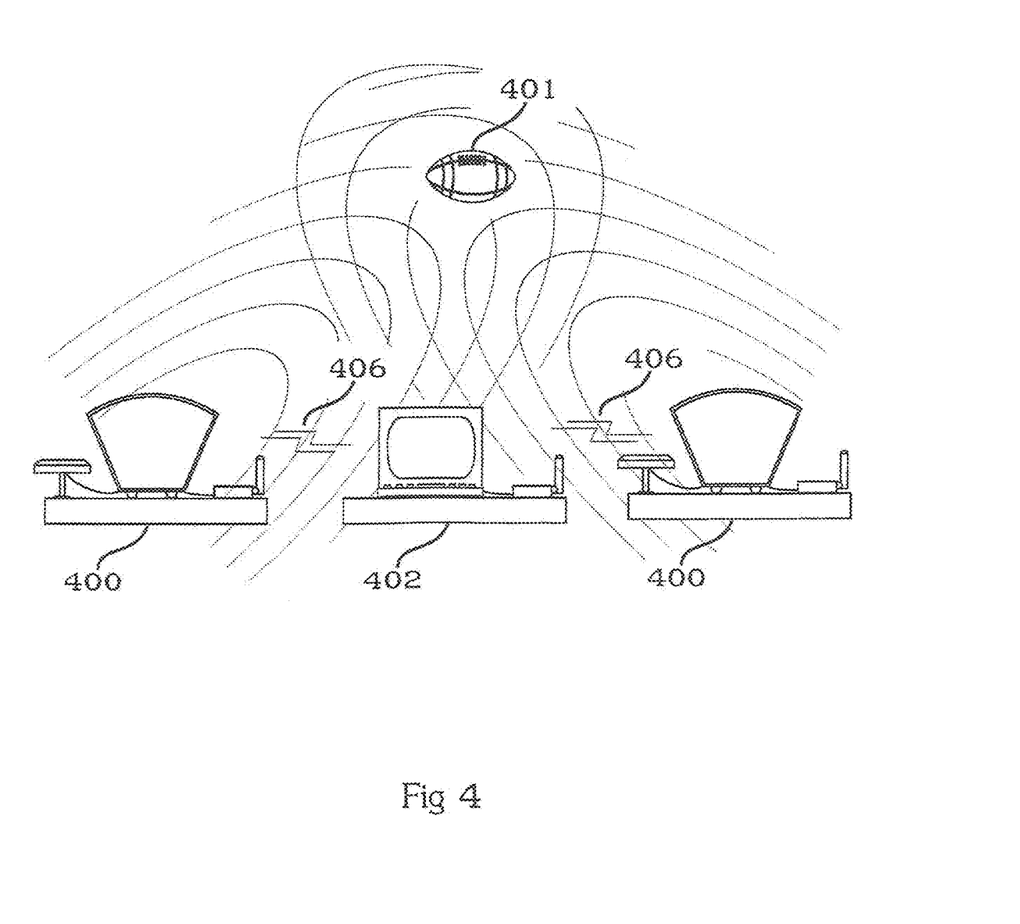
FIG. 4 shows two operational elements resting on the ground with a main computer positioned between the elements and an air bound object being tracked by the radar operational elements.

FIG. 4 shows a network with individual radar operational elements 400 capable of detection out to several hundred or even thousands of meters, depending on emitted power levels and type of target. Multiple radar operational elements can be networked together to provide continuous, overlapping coverage of a line or area of interest. Further individual radar operational elements 800, whether or not they are networked, are equipped with communications and location information capabilities (e.g. built in GPS or manually surveyed into position) and can be commanded to self-assemble into an array or extend an already installed array. By doing this operation, networked radar operational elements 400 can cooperatively share information about monitored and/or detected objects, which allows them to detect and monitor the location of the object and/or create trajectories of the object (like, e.g., object 401—in this case a football) as it moves, inform other radar operational elements 400 of impending contacts, put multiple radar operational elements 400 on the same objects to get more accurate information about that objects (position, speed, size, etc.) or perform a combination of the foregoing tasks. The inventive system is also capable of highlighting gaps and/or conclusions in coverage and informing the operator of the need to reposition radar operational elements 400, add more radar operational elements 400, or take some other actions. Accordingly, the information transmitted between radar operational elements 400 and main control computer 401 may be capable of controlling operational attributes of and detection by such radar operational elements 400. Also, given the possible means for transmitting information between radar operational elements 400, radar operational elements 400 do not have to be in close proximity for the system to work effectively and efficiently.

In one preferred embodiment of the present invention, radar operational elements 400, when deployed at a distance from the points of origin of object 401. are capable of communicating with the human operator/user at the points of origin or at different locations, or, if the operation is more automated, with the programmed equipment at such points of origin or different location. Main control center at remote location 402 may comprise software that includes operational objectives and a user interface and could be run on any computer that has networking and/or satellite communications access. The inventive radar operational elements 400 have the advantages of (A) reach—the multiplicity of deployments of radar operational elements 400 can cover larger areas as desired, (B) timing—the activation of radar operational elements 400 at differing times, and (C) mobility—the smaller sizes of radar operational elements 400 facilitating their deployment almost anywhere.

In particular, FIG. 4 shows multiple deployments of present inventive radar operational elements 800 and a depiction of remote location 402. in a preferred embodiment, one or more radar operational element((s) 400 can be in communication with the computer at remote location 402 through the transmission of information via signals 806 between one or more radar operational elements 400 and remote location 402. An operator/user could, thus, operate remote location 402 as a main control center. In such a configuration, the operator/user could operate functions of applicable radar operational elements 400. The human operators/users and/or the equipment at remote location 402 could coordinate some or all of the activities of radar operational elements 400. If networked, the main control center could communicate and coordinate the activities of more than one radar operational elements 400, while also receiving and/or sending signals to objects 401 (when object 401 includes the applicable technology). Such chain control enter could accomplish this coordination with transmission enabled objects 401, for example, through signals 806 transmitted first to one or more radar operational elements 400. Amongst the components of the networked elements, the main control center could be tasked with high level planning and administration of human operator/user authorizations.

In a further embodiment, remote location 402 could be enabled to detect and/or track object 401. In FIG. 4, object 401 is a regulation football, but one of ordinary skill in the art would realize that object 401 could be one of a variety of air bound elements. Further, one with ordinary skill in the art would realize that object 401 could include (A) transmission elements that enhance the ability of remote location 402, through its communication with radar operational elements 400, to detect and/or track such object 401, (B) receiving elements that enable object 401 to receive signals from remote 402, or (C) one or more elements that enable transmission and receiving. In still a further embodiment, one or more radar operational elements 400 could also (with remote location 402), or could instead (of remote location 402), be in communication with, for example, transmission/receiving enabled objects 401. In, certain embodiments, the transmission of information and other communication could be accomplished through over-the-air (e.g., wireless) communications, such as, for example, through radio signals, cellular technologies or other means, now known or to be known. Using such technologies within one or more radar operational elements 400 (e.g., communications technology, processing systems and means of automatically determining its geographical location), that can be either manually programmed and/or automatically adjusted the system can be better equipped to be more accurate and precise in its readings and measurements.

The human operator/user could program radar operational element 400 via the user interface. He/she could program missions, monitor transmission enabled objects in communication with radar operational elements 400, set global parameters, choose specific targets, and check the health of radar operational elements 400 or any element thereof. Such human operators/users could also, for example, select specific radar operational elements 400 locations or transmission enabled objects and monitor them closely. In addition to high-level mission parameters, the human operators/users could select specific transmission enabled objects 401 or radar operational elements 400 for direct access to data where radar operational elements 400 require human intervention (e.g. the human is required to select or approve a target).

The inventive system includes a means for transmitting information between two or more radar operational elements 400. In a further enhanced version of the inventive system transmission is exchanged between one or more radar operational elements 400 and transmission enabled objects 401. In addition to the transmission of information between radar operational elements 400 and transmission enabled objects 401, there is also, in another embodiment of the inventive system, a means for transmitting information between the radar operational elements 400 and a main control center at remote location 402, which may be a notable distance from the radar operational elements 400.

Figure 5:
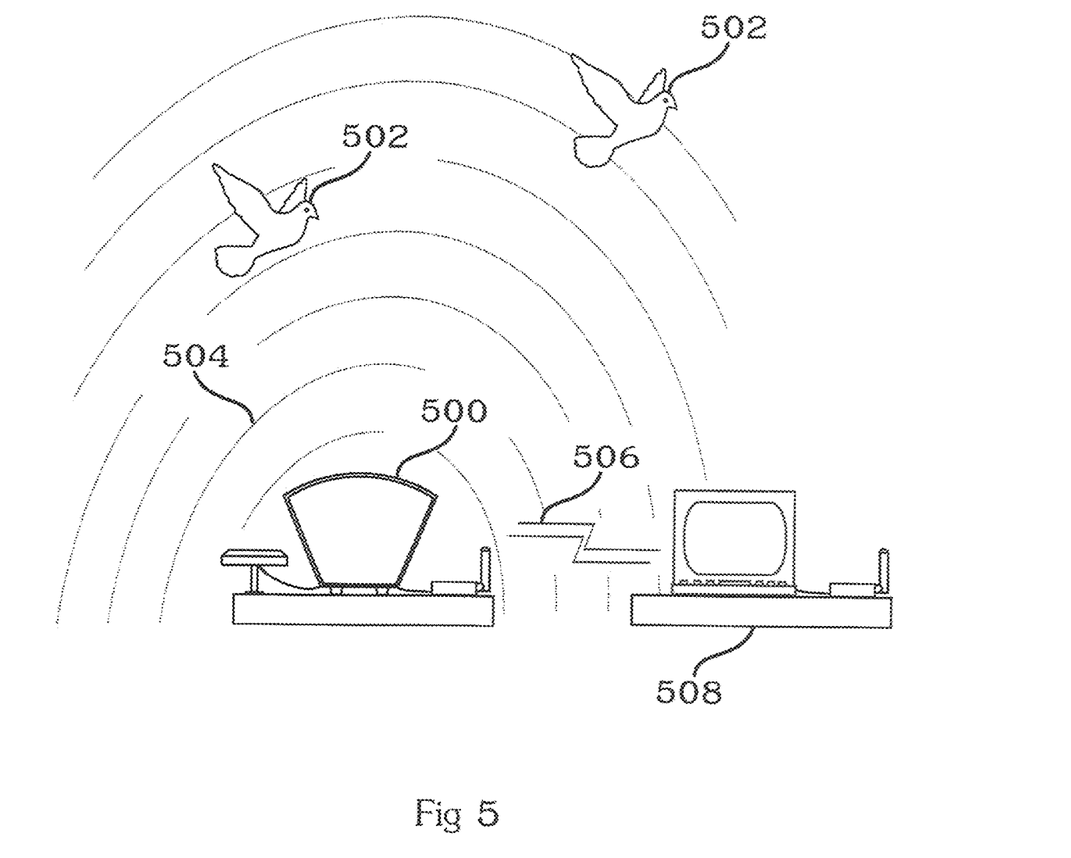
FIG. 5 shows a radar operational element, a set of objects being detected and tracked by the radar operational element, and a command center where signals are transmitted to and from radar operational element.

FIG. 5 shows an example of how a multitude of objects 502 could be detected and tracked with a single radar operational element 500. Signal 504 transmits from radar operational element 500 to objects 502. In such a configuration, an operator/user could coordinate the detection and tracking of objects 502 relative a specific location. Further, radar operational element 500 could be in communications with command center 508 through signal 506. Such facility to communicate could allow to an operator user to thus, through this particular embodiment of the invention, coordinate the detection and tracking of objects 502 from a location remote from radar operational element 500 and, if and as necessary, to also remotely manage the activities of radar operational element 500. Another element a particular embodiment of the present invention is a means for transmitting information between, for example, radar operational element 500 and command center 508 to monitor travel by objects 502 in relation to radar operational element 500. Such information could include, for example, data regarding the flight time of, destination of, information and sample gathered by, and other operations of one or more objects 502. Command center 508, attached to radar operational element 500, provides a means for monitoring, for example, environmental conditions and other local circumstances in the geographical proximity of such radar operational element(s).

One of ordinary skill in the art would realize that the present invention could also be used to detect and track objects that are not air bound. For examples, the present invention could be used in roadside tracking activities. As part of such a deployment, one or more radar operational elements could be set up along roads or highways such that the coverage of the radar operational elements includes, for example, the area along the sides of the road or highway, the surface of such road or highway, or a combination of areas and surfaces. When an object approaches the area covered by the radar operational element, such as a deer, coyote, moose, or other moving or, movable object, the system of the present invention could, for example, detect and track the approach, log the time and location of the engagement, and then transmit information about the situation to a detecting device or system (e.g., a receiver of an oncoming vehicle or a stationary monitoring system). The receiver in an oncoming vehicle could be part of or connected with, for example, (A) a mobile phone application that would, in essence, be managed by someone in the approaching vehicle or (B) the vehicle itself, if properly equipped with the necessary technology. Additional and more specific users of the present invention deployed roadside could be emergency responders or autonomous operated vehicles. With the detection and tracking of the circumstances of the area covered by the present invention system, the system can thus, for example, warn oncoming vehicles (with or without drivers) about the possibility of an animal entering the road or being on the road before such vehicles (or their drivers) might otherwise detect the animal, thereby improving safety. Further, the same system, or a derivative of it, could be used to inform emergency responders of vehicles that are stationary on the side of the road or highway—an indication that assistance may be needed.

Another area in which the present invention could be useful in connection with objects that are not air bound is on or near railroad tracks. With such an embodiment of the present invention, the radar operational elements could be, for example, set up along railroads and/or in the vicinity of railroad crossings to detect obstacles on or crossing the tracks. The system could then warn oncoming trains and/or train traffic controllers of objects on the tracks that might be hazards. In the reverse scenario, the same radar operational elements could monitor the arrival time and speed of passing trains and report such information to the train system controllers, thereby alerting the controllers with accurate information about train speeds and locations. Such detection could be made with respect to trains traveling too fast/slow or in unexpected locations.

When the present invention is deployed in a system located near or in an airport or other secure facility, the system could be configured to track airborne objects, objects on the ground, or combinations of the foregoing. The same system, or a derivative of it, could be positioned to monitor fences and property lines. In that way, the system could detect and report any attempt to access the property, such as airfields, equipment storage yards, military installations, etc.

Using the present invention in a smaller or more discrete environment, the system could be used to track objects such as footballs (as suggested above), golf balls, tennis balls, race cars, etc. Such an embodiment could supply tracking data to other systems or devices, such as, for example, tracking cameras (that could follow the ball/car). It could work in conjunction with or incorporate technology to highlight the target object for display on screens and monitors.

Still another embodiment of the invention could be used in water environments. In this case, the present inventive system could be installed along waterfronts, harbors, rivers or other bodies of water to monitor, for example, shipping traffic. The radar operational elements could be, in specific instances, placed on buoys/fixed installations at sea to monitor the local area for unauthorized ship traffic (e.g. illegal goods/people smuggling).

With regards to the inventive process, the present invention is a method of communicating with one or more transmission enabled objects. This process includes the step of transmitting a signal between a remote location and a distal location, such as, for example, a main control center. The process also includes transmitting a signal between such radar operational element's location and transmission enabled objects. The foregoing may enable the positioning of such transmission enabled objects—if and to the extent their position can be controlled remotely—in close proximity with the radar operational element's location.

ADDITIONAL THOUGHTS

The foregoing descriptions of the present invention have been provided for the purposes of illustration and description. It is not intended to be exhaustive or to limit the invention to the precise forms disclosed. Many modifications and variations will be apparent to the practitioner of ordinary skilled in the art. Particularly, it would be evident that while the examples described herein illustrate how the inventive apparatus may look and how the inventive process may be performed. Further, other elements/steps may be used for and provide benefits to the present invention. The depictions of the present invention as shown in the exhibits are provided for purposes of illustration.

Although these teachings have been described with respect to various embodiments, it should be realized these teachings is also capable of a wide variety of further and ether embodiments within the spirit and scope of these teachings.

The embodiments were chosen and described in order to best explain the principles of the invention and its practical application, thereby enabling others of ordinary skill in the art to understand the invention for various embodiments and with various modifications that are suited to the particular use contemplated.

What is claimed is:

1. A radar system capable of providing coordinated detection in real or near real time, with such system comprising:
    at least one radar operational element exploiting high-resolution wide band radar technology;
    a main control computer;
    means for transmitting information between such at least one radar operational element and such main control computer, wherein the main control computer includes means for communication with such one radar operational element via over-the-air technology, and
    at least one other radar operational element, wherein such at least one radar operational element is electronically connected, via the main control computer, to, such at least one other radar operational element such that perceptive strength of a resulting array of radar operational elements is more powerful than each individual radar operational element alone.

2. The system of claim 1 wherein the array of radar operational elements can be manually assembled.

3. The system of claim 1 wherein the array of radar operational elements can be automatically assembled.

4. The system of claim 1 further comprising means of securing at least one such radar operational element to a movable apparatus.

5. The system of claim 4 wherein the movable apparatus is a vehicle for transport over water.

6. The system of claim 4 wherein the movable apparatus is a vehicle for transport over land.

7. The system of claim 4 wherein the movable apparatus is a vehicle for transport through the air.

8. The system of claim 4 wherein at least one such radar operational element can be powered by such vehicle.

9. The system of claim 1 further comprising means of securing at least one such radar operational element in a fixed geographical location.

10. The system of claim 1 wherein at least one such radar operational element further comprises communications technology, processing systems and means of automatically determining its geographical location.

11. The system of claim 1 wherein at least one such radar operational element can be manually programmed with its geographical location.

12. The system of claim 1 wherein at least one such radar operational element can be powered by a battery.

13. The system of claim 1 wherein at least one such radar operational element can be powered by solar power.

14. The system of claim 1 wherein at least one such radar operational element can be powered by a fuel cell.

15. The system of claim 1 wherein at least one such radar operational element can be powered by a form of wind-generated power.

16. The system of claim 1 wherein at least one such radar operational element can be powered from a local power grid.

17. The system in claim 1 wherein the information transmitted between such one radar operational element and such main control computer is capable of controlling operational attributes of and detection by such one radar operational element.

18. A radar system capable of providing coordinated detection in real or near real time, with such system comprising:
    at least one radar operational element exploiting high-resolution wide band radar technology;

a main control computer;

means for transmitting information between such radar operational element and such main control computer; wherein such radar operational element is electronically connected, via the main control computer, to at least one other radar operational element, such that perceptive strength of a resulting array of radar operational elements is more powerful than each individual radar operational element alone and further comprising means for transmitting information between such radar operational element and such other radar operational element in such array, wherein such radar operational element and such other radar operational element are not in close proximity.

19. A method of monitoring objects comprising the steps of:

detecting through the use of a detecting device an area through the use of at least one radar operational element exploiting high-resolution wide band radar technology;

transmitting at least one signal between such one radar operational element and a main control computer through the use of the transmission capabilities of such one radar operational element and such main control computer, transmitting at least one signal between at least one other radar operational element and such main control computer through the use of the transmission capabilities of such at least one other radar operational element and such main control computer; and processing within such main control computer the information contained in the signal received from such radar operational element and such other radar operational element to produce more definitive readings than would be produced using the information from fewer radar operational elements wherein the signals between the radar operational elements and the main control computer are transmitted via over-the-air technology.

20. The method of claim 19 further comprising the step of at least one radar operational element receiving a signal transmitted by a transmission enabled object.

21. The method of claim 19 wherein the signals between at least one of the radar operational elements and the main control computer are transmitted via a hard-wired connection.

22. The method of claim 19 wherein at least one of the radar operational elements can participate in the monitoring of at least one transmission enabled object while such radar operational element is mounted on a movable object.

23. The method of claim 19 further comprising the step of coordinating, through the use of the main control computer, the location of at least one of radar operational dements.

24. The method in claim 19 wherein the information transmitted between such main control computer and at least one of radar operational elements is capable of controlling operational attributes of and detection by such radar operational element.

* * * * *